US012573015B2

(12) United States Patent
Ehmann

(10) Patent No.: US 12,573,015 B2
(45) Date of Patent: Mar. 10, 2026

(54) METHOD FOR CAPTURING IMAGE MATERIAL FOR MONITORING IMAGE-ANALYSING SYSTEMS, DEVICE AND VEHICLE FOR USE IN THE METHOD AND COMPUTER PROGRAM

(71) Applicant: Volkswagen Aktiengesellschaft, Wolfsburg (DE)

(72) Inventor: Sebastian Ehmann, Wolfenbüttel (DE)

(73) Assignee: Volkswagen Aktiengesellschaft, Wolfsburg (DE)

( * ) Notice: Subject to any disclaimer, the term of this patent is extended or adjusted under 35 U.S.C. 154(b) by 964 days.

(21) Appl. No.: 17/594,748

(22) PCT Filed: Apr. 9, 2020

(86) PCT No.: PCT/EP2020/060208
§ 371 (c)(1),
(2) Date: May 19, 2022

(87) PCT Pub. No.: WO2020/221575
PCT Pub. Date: Nov. 5, 2020

(65) Prior Publication Data
US 2023/0145472 A1 May 11, 2023

(30) Foreign Application Priority Data

Apr. 30, 2019 (DE) .......................... 102019206147.8
Nov. 15, 2019 (DE) .......................... 102019217642.9

(51) Int. Cl.
*G06T 7/00* (2017.01)
*G06T 7/70* (2017.01)
(Continued)

(52) U.S. Cl.
CPC .............. *G06T 7/0002* (2013.01); *G06T 7/70* (2017.01); *G06V 10/62* (2022.01); *G06V 10/98* (2022.01);
(Continued)

(58) Field of Classification Search
None
See application file for complete search history.

(56) References Cited

U.S. PATENT DOCUMENTS

2016/0305794 A1    10/2016 Horita et al.
2018/0012082 A1*    1/2018 Satazoda .............. G06V 10/763
(Continued)

OTHER PUBLICATIONS

Lampert, Christoph H., Matthew B. Blaschko, and Thomas Hofmann. "Beyond sliding windows: Object localization by efficient subwindow search." 2008 IEEE conference on computer vision and pattern recognition. IEEE, 2008. (Year: 2008).*
Liu, Jiang, et al. "Rewind to track: Parallelized apprenticeship learning with backward tracklets." 2017 IEEE International Conference on Multimedia and Expo (ICME). IEEE, 2017. (Year: 2017).*
(Continued)

*Primary Examiner* — Samah A Beg
(74) *Attorney, Agent, or Firm* — Peter Zura; LOZA & LOZA, LLP

(57) ABSTRACT

Technologies and techniques for capturing image material for monitoring image-analyzing systems, wherein an object is monitored to determine if it has been correctly recognized by the image-analyzing system in respect of time or location. The images captured are recorded in a memory. When a discrepancy is determined, in object recognition beyond a tolerance limit over a temporal or locational reference, select images or image sections are archived for more precise inspection.

20 Claims, 8 Drawing Sheets

(51) Int. Cl.
　　　 *G06V 10/62* 　　　 (2022.01)
　　　 *G06V 10/98* 　　　 (2022.01)
　　　 *G06V 20/58* 　　　 (2022.01)

(52) U.S. Cl.
　　　 CPC .... *G06V 20/58* (2022.01); *G06T 2207/30241*
　　　　　　　 (2013.01); *G06V 20/582* (2022.01)

(56) References Cited

U.S. PATENT DOCUMENTS

| | | | |
|---|---|---|---|
| 2018/0137632 A1* | 5/2018 | Takada | G06V 30/248 |
| 2019/0050670 A1 | 2/2019 | Pogorelik | |
| 2021/0197861 A1* | 7/2021 | Galoogahi | G06T 7/50 |
| 2022/0309792 A1* | 9/2022 | Grundstrom | G06T 7/20 |
| 2023/0192145 A1* | 6/2023 | Das | G06T 7/246 |

OTHER PUBLICATIONS

Shen, Jianbing, et al. "Fast online tracking with detection refinement." IEEE Transactions on Intelligent Transportation Systems 19.1 (2017): 162-173. (Year: 2017).*

Tran, Diem-Phuc, and Van-Dung Hoang. "Adaptive learning based on tracking and ReIdentifying objects using convolutional neural network." Neural Processing Letters 50.1 (2019): 263-282. (Year: 2019).*

PCT/EP2020/060208. European International Search Report & Written Opinion. (Jul. 17, 2020).

Liu Jiang et al: "Rewind to track: Parallelized applet learning with backward tracklets", 2017 IEEE International Conference on Multimedia and Expo (ICME), IEEE, Jul. 10, 2017 (Jul. 10, 2017), pp. 433-438, XP033146619, DOI: 10.1109/ICME.2017.8019398.

* cited by examiner

Full HD                                        (1920 x 1080)

SD          (640 x 480)

VCD     (352 x 288)

METHOD FOR CAPTURING IMAGE MATERIAL FOR MONITORING IMAGE-ANALYSING SYSTEMS, DEVICE AND VEHICLE FOR USE IN THE METHOD AND COMPUTER PROGRAM

CROSS REFERENCE TO RELATED APPLICATION

The present application claims priority to International Patent App. No. PCT/EP2020/060208, titled "Method for Capturing Image Material for Monitoring Image-Analysing Systems, Device and Vehicle for Use in The Method and Computer Program" to Sebastian Ehmann, filed Apr. 9, 2020, which further claims priority to German Patent Application No. DE 10 2019 206 147.8, filed Apr. 30, 2019, and German Patent Application No. DE 10 2019 217 642.9, filed Nov. 15, 2019, the contents of each being incorporated by reference in their entirety herein.

FIELD OF TECHNOLOGY

The present disclosure relates to the technical field directed to advanced driver-assistance systems to autonomous vehicles. The present disclosure also relates to a method for recording images for monitoring image-analyzing systems. The present disclosure also relates to a device and a vehicle for use with the method, and a computer program.

BACKGROUND

Technologies that are intended for future autonomous driving are currently being worked on intensively. A first approach is the introduction of various advanced driver-assistance systems that assume certain duties of the driver. Examples of advanced driver-assistance systems are blind spot information systems, emergency braking assistance, parking assistance, turning assistance, lane keeping assistance, speed control assistance, etc. A further stage in the development involves combining numerous assistance systems. This does not entirely relieve the driver of his duties, but instead allows the driver to assume control of the vehicle at any time. The driver then assumes monitoring functions.

It can be assumed in the immediate future that through the implementation of new technologies on the part of the system (vehicle-to-vehicle communication, use of new databases, backend connections, cloud services, server input, vehicle sensors, etc.) comprehensive information regarding objects (in particular vehicles) in the visible and concealed/non-visible environment of the vehicle itself will become available. In particular, the following components in the field of vehicle sensors, which enable environment monitoring, have been specified: radar devices corresponding to radio detection and ranging, lidar devices, corresponding to light detection and ranging, mainly for the field of distance detection/warning, and cameras with corresponding image processing for the field of object recognition. Ultrasonic and infrared sensors are also specified.

These data regarding the environment can therefore be used as a basis for recommendations, warnings, etc. By way of example, displays/warnings regarding the direction another vehicle in the environment may turn (possibly in the trajectory of the vehicle in question) are also conceivable in this regard. Traffic sign recognition is also specified as another application, which is important with regard to determining legal frameworks.

Vehicle-to-vehicle communication is also important in autonomous driving. Mobile communication systems such as LTE (Long Term Evolution) and 5G have been developed recently, which also contribute to vehicle-to-vehicle communication. Systems based on WLAN technologies for direct communication with vehicles are also available, in particular the system according to WLAN p. The term "autonomous driving" is used in different ways in some of the documentation.

For a clarification of the term, the following comment is provided here. Autonomous driving (also referred to in some cases as automatic driving, automated driving, or piloted driving) is understood to be the movement of vehicles, mobile robots and driverless transport systems, which are substantially autonomous. There are various levels of autonomous driving. Some of these levels also refer to when there is still a driver in the vehicle, who may only monitor the automatic driving procedure. In Europe, the various traffic ministries have cooperated (in Germany, this is referred to as the Bundesanstalt für Straßenwesen [EN: Federal Highway Research Institute]), and defined the following autonomy levels:

Level 0: "Driver Only," the driver drives, steers, accelerates, brakes, etc.

Level 1: Certain assistance systems help in operating the vehicle (including an automatic cruise control ACC).

Level 2: Partial automation. Among others, automatic parking, lane keeping assist, general longitudinal guidance, acceleration, braking, etc. are assumed by the assistance system (including a traffic assist).

Level 3: High automation. The driver does not need to continuously monitor the system. The vehicle independently executes functions such as triggering blinkers, lane changes, and lane keeping. The drive can assume other things, but may be required by the system to take control of the steering with sufficient warning. This form of autonomy can be achieved technically on highways. Legislators are working on making Level 3 vehicles legal. The legal framework has already been laid out for this.

Level 4: Full automation. The control of the vehicle is permanently assumed by the system. If the system does not assume the duties of the driver, the driver may be required to assume control.

Level 5: No need for a driver. Aside from determining the destination and starting the system, no human engagement is necessary.

Automated driving functions starting at level 3 take over the responsibility of controlling the vehicle from the driver. The VDA [German Association of the Automotive Industry] has issued a similar classification of the various autonomy levels, which can likewise be used.

Because of the current development toward higher autonomy levels, in which numerous vehicles can still be controlled by the driver, however, it can be assumed accordingly that additional information will still apply to manually controlled vehicles for the time being, and not primarily for highly automated systems in the long term.

Regarding driver-to-vehicle interaction, there is the question of how this information can be presented such that there is a real benefit for human drivers, such that they can also contextualize this information quickly and intuitively. The following solutions in this field are already known from the prior art.

A vision of the future in the automotive industry is that the windshield in the vehicle can be used for displaying virtual elements, giving the driver certain advantages. "Augmented reality" (AR) and "mixed reality" (MR) technologies are used for this. The less common German terms for this are "erweiterten Realität" and "gemischten Realität." This involves enriching the real environment with virtual elements. This has numerous advantages: there is no need to look down to displays other than that on the windshield, because much of the relevant information appears in the windshield. As a result, the driver does not have to look away from the road. Furthermore, because the virtual elements are placed in corresponding locations in the real environment, the driver does not need to make as much of a cognitive effort as would be necessary to interpret graphics shown in a separate display. Benefits can also be obtained with regard to automatic driving. Reference in this regard is made to the article, "3D-FRC: Depiction of the future road course in the Head-Up Display" by C. A. WEisner, M. Ruf D. Sirim and G. Klinker in 2017 IEEE International Symposium on Mixed and Augmented Reality, in which these advantages are explained in greater detail.

Because the technological means are currently limited, it can be assumed that a windshield that can be used entirely as a display will not be available in the immediate future. Head-up displays are currently used in vehicles. These also have the advantage that the image in the HUD appears to be closer to the real environment. These displays are actually projection units that project an image onto the windshield. This image then appears at between a few meters and 15 meters in front of the vehicle from the perspective of the driver, depending on the design of the module.

The "image" in this case is composed in the following manner: this is not so much a virtual display, but instead a type of "keyhole" view into the virtual world. The virtual environment is theoretically superimposed onto the real world, and contains the virtual objects that help and inform the driver. The limited display area of the HUD consequently only shows a section. One sees this expert of the virtual world though the display area of the HUD. Because this virtual environment supplements the real environment, this is also referred to as a "mixed reality."

A major advantage of the "augmented reality" displays (AR displays) known so far is that these displays are shown directly within, or as part of, the environment. Relatively obvious examples usually relate to the field of navigation. While classic navigation displays (in conventional HUDs) normally show schematic depictions (e.g., an arrow at a right angle pointing to the right as an indication that a right turn should be made at the next opportunity), AR displays offer substantially more effective possibilities. Because the displays can be shown as "part of the environment," they can be interpreted extremely quickly and intuitively by the user. The driver, as well as a higher level of automatic driving functions, must be able to assume that the objects will be seen correctly. If additional information is to be derived therefrom, this information should be shown in the right place in the image.

For this reason, it is important that the image capturing system functions correctly, at least in testing. This can also be the case in normal operation as well. Traffic is extremely complex, and there may be so many moving elements therein that some things are concealed. Other problems relate to limited view as a result of weather conditions, e.g., fog, rain, snow, etc., as well as glare, darkness, and other factors.

A vehicle-based system for traffic sign recognition is known from US 2016/0170414 A1. This makes use of lidar sensors, radar sensors, and cameras. The position of the vehicle is also detected using GPS. The traffic signs and their locations are reported externally and registered in a database.

A vehicle-based system for monitoring traffic sign recognition is known from US 2017/0069206 A1. Environment sensors such as lidar sensors, radar sensors and cameras are also used therein. The traffic signs and their locations are also reported externally and registered in a database therein. Various monitoring measures are proposed for detecting errors, including manual visual inspections by technical staff, visual inspections "crowdsourcing," computer-supported analysis, and statistical analysis.

A vehicle-based system and a method for traffic sign recognition is known from US 2018/0260639 A1. The traffic signs are stored with their positions in an image processing unit.

Objects recognized in video images from a camera used in a vehicle for traffic monitoring are shown with supplementary information obtained from other sensors in the vehicle in US 2008/0239078 A1.

A method for image analysis is known from US 2018/0012082 A1, wherein the sequence of images is recorded by a camera mounted on a vehicle. The image analysis system contains an object recognition module. A limit frame is defined, which serves to emphasize objects by outlining them.

A vehicle environment monitoring system is known from US 2018/0201227 A1, in which the vehicle environment is monitored with a camera. The vehicle also comprises a display unit for video images recorded by the camera. There is an image analysis unit that monitors the image data for moving external objects in the environment. There is also a control unit that is programmed to determine a danger assessment value based on the conditions in the proximity of the vehicle, and uploads image data to an external server if the danger assessment value is greater than a threshold value.

The known solutions have various disadvantages. These have been acknowledged in the framework of the present disclosure. With the currently known image capturing methods for use in the field of driver assistance, there is the problem that they cannot be checked, or can only be checked inadequately, to make sure they are functioning correctly when in operation. As a result, some objects may be identified or classified incorrectly.

There is therefore a need for further improvements in checking vehicle-based image capturing systems, in particular for analyzing methods that enable a subsequent analysis in the case of erroneous recognitions.

SUMMARY

Aspects of the present disclosure are to find such an approach. The effort needed for archiving image data as a prerequisite for the subsequent analysis should also be kept low. Certain aspects are described by a method for capturing image material for checking image analysis systems, a device and a vehicle for use with the method, and a computer program according to the present disclosure and appended claims.

The dependent claims contain advantageous developments and improvements of the present disclosure corresponding to the following descriptions of these measures.

In another patent application by the applicant, ways are shown for how only certain image sections for data recording/transmission to a backend can be taken into account using a ring buffer for images recorded by environment sensors and taking odometry data from the vehicle into account, in order to reduce the necessary amount of data.

According to one aspect of the present disclosure, a method is disclosed for capturing image material of checking image analysis systems is checked to see whether an object recognition has taken place correctly in terms of time and location by the image analysis system. If this is the case, there is no need to retain any image data for subsequent analysis. If errors are detected in the temporal and spatial analysis, however, which lie outside a tolerance limit, there is a step in which it is determined which images or image sections should be archived for more precise analysis, and these images or image sections are then archived. The method has the advantage that an image analysis system that supplies safety-relevant data can be checked while in operation, wherein the memory use for the check is low. The method can be used particularly advantageously for testing the image analysis system, which is still in the development stage. The method an also be used advantageously in serial production. This is advantageous with regard to being able to make subsequent improvements in the image analysis systems that have already been installed.

The solution can be used in particular for stationary objects such as traffic signs, etc. It is also necessary to be able to recognize moving objects in the recorded objects, particularly with regard to autonomous driving. The image analysis algorithms are still prone to error, however. To be able to improve the algorithms, subsequent analyses are also necessary in the case of errors. For this reason, there is further need for improvements in checking vehicle-based image capturing systems.

To also be able to do this with moving objects, a trajectory of the moving object is determined or obtained in which the error is identified. In the future, it will be the case that vehicles equipped with automatic driving functions will be able to calculate a trajectory for their own movements. They will then be able to send their trajectories to other vehicles in the environment through direct communication with these vehicles. As a result, another vehicle will be able to estimate the positions where the objects were located, prior to their detection by the object recognition. It can then be determined which images and image sections are relevant for subsequent analysis through reverse calculation. The present disclosure also provides that these image sections are extracted from the recorded images and only archived to the extent that they are necessary. This takes place by referencing the odometry and position data for the vehicle, as well as drawing on the trajectories of the relevant dynamic objects. The dynamic objects are normally other traffic participants. To be able to access these images and image sections, a ring buffer is needed, the size of which, (i.e., maximum storage time) is dimensioned according to the function and speed.

The method has the advantage that an image analysis system that supplies safety-relevant data can be checked while in operation, while the amount of memory that is necessary for this checking is low. The method can be particularly advantageously used for testing the image analysis systems that are still in the development stages. This is advantageous in terms of being able to make improvements in image analysis systems that are already installed, or being able to determine whether a camera or sensor is out of adjustment, such that the vehicle needs to go in for maintenance.

It is advantageous if a reverse calculation is carried out using the trajectory in order to calculate a number of images or image sections in which the moving object might be visible, even if the object recognition was unable to recognize the moving object therein.

It is also advantageous if an object recognition algorithm is used for the image analysis, and it is determined how far it was to the object when it was recognized in order to check whether the object recognition has taken placed correctly in terms of the time and location, wherein a standard recognition distance is established, that indicates the distance at which the object recognition algorithm is able to recognize the object. If the distance at which the object was actually recognized is different than the standard recognition distance, the images or image sections recorded between the standard recognition distance and the actual object recognition distance are archived for a more precise analysis.

In another embodiment, a first analysis of the problematic image data can already take place in the vehicle. This can take place such that it is determined, for example, whether this error is due to an intermediate concealing of the object by other objects. This is frequently the case in traffic, e.g., when buses or trucks block traffic signs. In this case, the error could be explained, and there would be no need to archive any data, or a reduced data set could be stored (e.g., just a few seconds prior to the first successful object recognition).

The present disclosure can be used particularly advantageously for testing image analysis systems in vehicles. These now have imaging environment detection sensors such as cameras, lidar and radar sensors. These are able to detect traffic signs, leading vehicles and other traffic participants, intersections, turns, potholes, etc. These vehicles are also equipped with position detection systems. Using the detected position of the vehicle, it is possible to check whether the image recognition is correct. In the simplest case, the vehicle detects the position of the object that has been recognized, even if it passes the location of the object. The distance between the vehicle and object can then be calculated. In another embodiment, the position of the object can be derived from a very precise map. In another variation, the position can be estimated on the basis of the position of the vehicle.

Satellite navigation and/or odometry can be used to obtain the position data for the vehicle and the object. GNSS, for Global Navigation Satellite System, is a general term such a satellite navigation system. Existing satellite navigation systems are the Global Positioning System (GPS), Galileo, GLONSSS (Globalnaja nawigazionnaja sputnikowaja sistema) or Beidou.

In one embodiment, the images or image sections determined through reverse calculation are sent to an external archive. This has the advantage that only the problematic images need to be archived. The archiving in an external archive has the advantage that the images do not need to first be archived in the vehicle. The analysis should take place at the external location by experts who are capable of improving the image analysis system anyway.

In another variation, the images or image sections recorded between the standard recognition distance and the object recognition distance, or obtained through reverse calculation, are archived in a memory in the vehicle. This requires a memory in the vehicle. The archived images can then be accessed later by experts. This can take place at a repair shop. In another advantageous variation, the images stored temporarily in the vehicle are then sent to an external location when the vehicle is back at the residence of the vehicle's owner. Modern vehicles are equipped with WLAN. When the vehicle is then logged into the private WLAN network of the vehicle's owner, the transmission of the archived image data can take place at a higher data transfer rate. This is advantageous in comparison with immediate transmission via a mobile communication system the vehicle is logged into while underway in that it is less expensive for the vehicle's owner, and the mobile network is subjected to less activity. Its capacity can then be exploited by other applications.

Alternatively, other images or image sections can be archived in order to expand the analysis possibilities. It is advantageous if the images or image sections recorded between the standard recognition distance and the object recognition distance are archived at a higher quality and the other images or image sections are archived at a lower quality. This reduces the amount of space required for storage, as well as the bit rate for the transmission, with regard to these other images or image sections.

Another advantageous variation determines the sizes of the image sections that are to be archived and/or the period of time for which the images or image sections are to be archived on the basis of one or more of the following environment parameters:

Precision of the determination of the position of the vehicle and/or the object;

Time of day, in particular a distinction between night and day;

Weather conditions;

Traffic conditions;

Road quality.

This is advantageous when the environmental conditions are not always the same. It is the case in practice that the environmental conditions change constantly. If the same number of images or image sections are always archived, if the environmental conditions change, it may easily be the case that important events may be overlooked, such that the causes of problems cannot be found.

For a device for use with the method according to any of the preceding claims, it is advantageous if the device contains an imaging device, a computing device, and a memory. The computing device is configured in this case such that it can recognize objects in the images supplied by the imaging device. The computing device then also has the task of determining whether the object recognition has taken placed correctly in terms of time and location. The computing device can be configured for this such that when it identifies a difference between the object recognition and the standard recognition distance that is greater than a tolerance limit, it can determine which images or image sections should be archived for a more precise analysis, and output a command to archive these images or image sections. It is also advantageous if the computing device is configured to calculate a trajectory of the moving object, and to determine which images or image sections should be archived based on this calculated trajectory. The use of the trajectory makes it possible to better limit the images or image sections that are to be archived, thus lowering the overall archiving.

In some examples, the device also includes a communication module, and the communication module is configured to send the images or image sections to an external archive after receiving the command to archive these images or image sections. The external archive can be a computer center run by the manufacturer of the image analysis system or the vehicle.

Another variation is proposed in which the device includes a memory, and the memory is configured to store the images or image sections after receiving the command to archive these images or image sections. In this variation, the archiving takes place in the vehicle, until the data have been accessed. As described above, this accessing can take place in a repair shop, or the data can be sent to the external archive after the vehicle has returned to its own WLAN network.

For the temporary storage of the data in the vehicle, it is advantageous when the memory is a ring buffer, in which the storage sequence overwrites the oldest images or image sections that have been stored with the new images or image sections.

A video camera, or lidar or radar sensor can be used as the imaging device. The interface for wireless communication can advantageously be an interface according to at least one of the WLAN communication systems, corresponding to a standard for the IEEE 802.11 standard family, or an LTE or 5G mobile communication system, corresponding to a 3GPP standard.

It is advantageous if the vehicle used with the method is equipped with a device that corresponds to the device proposed above.

The advantages described in reference to the method according to the present disclosure also apply to a computer program that runs in a computing device to execute the steps for capturing image material according to the method according to the present disclosure.

BRIEF DESCRIPTION OF THE DRAWINGS

Exemplary embodiments of the present disclosure are shown in the drawings, and shall be explained below in greater detail in reference to these drawings.

Therein:

FIG. 10 shows an illustration of the variation in image quality for archiving image material on the basis of environmental conditions under some aspects of the present disclosure; and FIG. 11 shows an illustration of the variation in recording times for archiving image material on the basis of environmental conditions under some aspects of the present disclosure.

DETAILED DESCRIPTION

The detailed description illustrates the principles of the disclosure according to the present disclosure. It is to be understood that persons skilled in the art are capable of conceiving of various assemblies which may not be explicitly described herein, but embody the principles of the disclosure according to the present disclosure, and are likewise protected in their scope.

Figure 1:
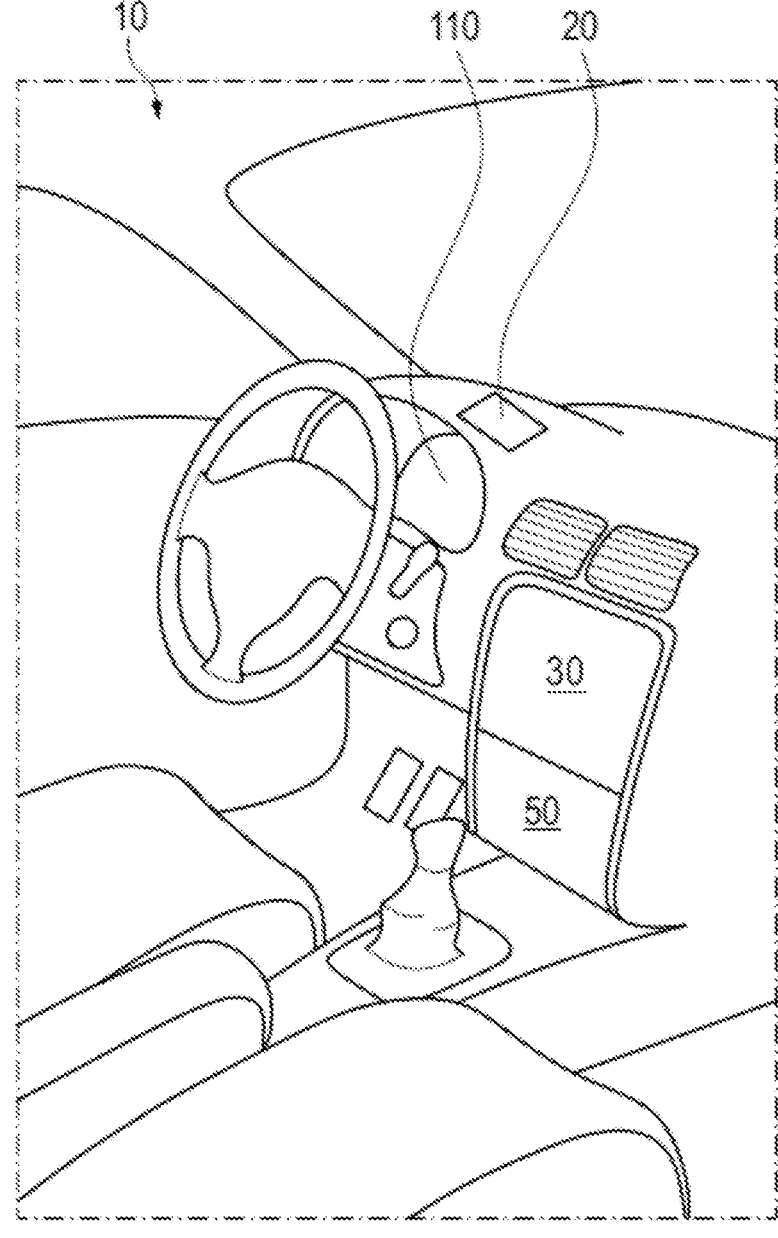
FIG. 1 shows a typical cockpit in a vehicle.

FIG. 1 shows a typical cockpit of a vehicle 10. This is illustrated in the figure as a passenger automobile. Any other vehicle can also be regarded as the vehicle 10. Examples of other vehicles are: buses, utility vehicles, in particular trucks, agricultural machines, construction machines, rail vehicles, etc. The use of the present disclosure in general is possible with land vehicles, rail vehicles, watercraft and aircraft.

Two display units for an infotainment system are shown in the cockpit. These include a touch-sensitive screen 30, which is installed in the central console, and the instrument cluster 110, which is in the dashboard. The central console is not in the field of vision of the driver while driving. For this reason, additional information is not displayed on the display unit 30 while driving.

The touch-sensitive screen 30 is used for operating functions in the vehicle 10. By way of example, a radio, navigation system, music playback and/or air conditioning, other electronic devices, or other comfort functions or applications in the vehicle 10 can be controlled therewith. On the whole, this is frequently referred to as an "infotainment system." An infotainment system in a motor vehicle, in particular a passenger vehicle, refers on the whole to a radio, navigation system, hands-free speakerphone, advanced driver-assistance system, and other functions in a central operating panel. The term, "infotainment" is a portmanteau, combining the words "information," and "entertainment." Mainly, the touch-sensitive screen 30 ("touchscreen") is used to operate the infotainment system, wherein this touchscreen 30 can be easily seen and operated in particular by a driver of the vehicle 10, but also by a passenger in the vehicle 10. Mechanical operating elements, e.g., buttons, dials, or combinations thereof, such as push-button knobs, can be located in an input unit 50 beneath the touchscreen 3. Typically, parts of the infotainment system can also be operated from the steering wheel. This is not shown separately, but is regarded as part of the input unit 50.

FIG. 1 also shows a head-up display 20. The head-up display 20 is attached behind the instrument cluster 110 in the region of the dashboard, from the perspective of the driver. This is an image projection unit. By projecting it onto the windshield, additional information is shown in the field of vision of the driver. This additional information appears as though it is projected onto a projection surface 21 at a distance of 7-15 meters in front of the vehicle 10. The real world still remains visible, however, through this projection surface 21. A virtual environment is basically generated with the display of the additional information. The virtual environment is theoretically superimposed on the real world, and contains virtual objects that help and inform the driver while driving. This is only projected onto part of the windshield, however, such that the additional information cannot be placed arbitrarily in the driver's field of vision. This manner of display is also referred to as "augmented reality."

Figure 2:
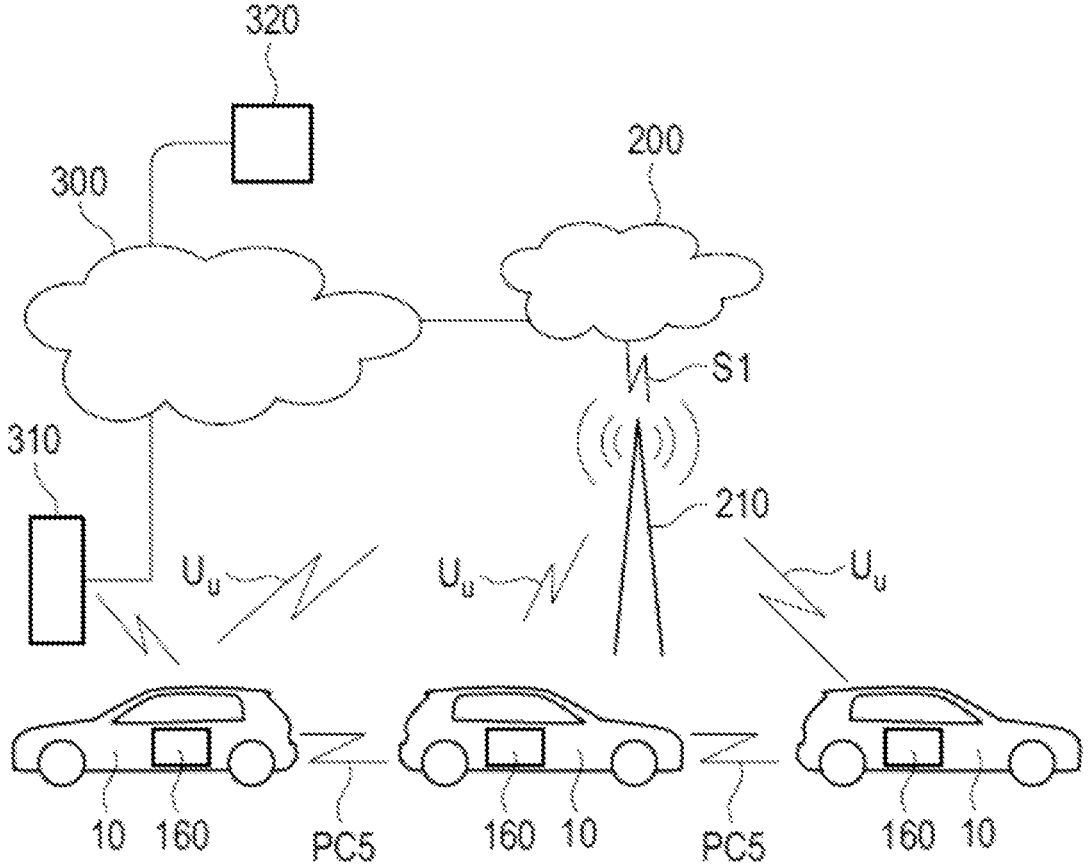
FIG. 2 shows an illustration of the principles of the various communication possibilities provided in a vehicle for external communication.

FIG. 2 shows a system architecture for mobile vehicle communication. The vehicles 10 are equipped with an onboard communication module 160 comprising corresponding antenna units, such that it can participate in various types of vehicle communication, e.g., V2V and V2X. FIG. 1 shows that the vehicle 10 can communicate with a mobile base station 210 for a mobile communication provider.

Such a base station 210 can be an eNodeB base station from an LTE mobile communication provider (Long Term Evolution). The base station 210 and the corresponding equipment are part of a mobile communication network that comprises numerous mobile cells, wherein each cell is operated by a base station 210.

The base station 210 is located near a main street on which the vehicles 10 travel. In the terminology of LTE, a mobile end device corresponds to user equipment UE, which enables a user to access network services, connecting the user to UTRAN or Evolved-UTRAN via the mobile interface. This user equipment typically comprises a smartphone. These mobile end devices are used by the passengers in the vehicles 10. The vehicles 10 are also each equipped with an onboard communication module 160. This onboard communication module 160 can also be equipped with a WLAN p-module, in order to participate in an ad hoc V2X communication mode. V2V and V2X communication is also supported by the new $5^{th}$ generation of mobile communication systems. This mobile interface therein is referred to as a PC5 interface. With regard to the LTE mobile communication system, the Evolved UMTS Terrestrial Radio Access Network E-UTRAN from LTE is composed of numerous eNodeBs, which provide the E-UTRA user levels (PDCP/RLC/MAC/PHY) and the control levels (RRC). The eNodeBs are connected to one another by means of the so-called X2 interfaces. The eNodeBs are also connected to the EPC (Evolved Packet Core) 200 via the so-called 51 interfaces.

From this general architecture, FIG. 2 shows that the basis station 210 is connected to the EPC 200 via the 51 interface, and the EPC 200 is connected to the internet 300. A backend server 320, to and from which the vehicles 10 can send and receive messages, is also connected to the internet 300. In this case, the backend server 320 can be located in a computing center for the vehicle manufacturer. Lastly, a street infrastructure station 310 is also shown. This can be illustrated by a unit on the street, commonly referred to in the art as a "road side unit," RSU 310. To simplify the implementation thereof, it is assumed that all of the components are assigned an internet address, typically in the form of an IPv6 address, such that the packets that transport messages between the components can be routed accordingly. The various interfaces specified above are standardized. Reference is made in this regard to the corresponding LTE specifications, which are published.

Figure 3:
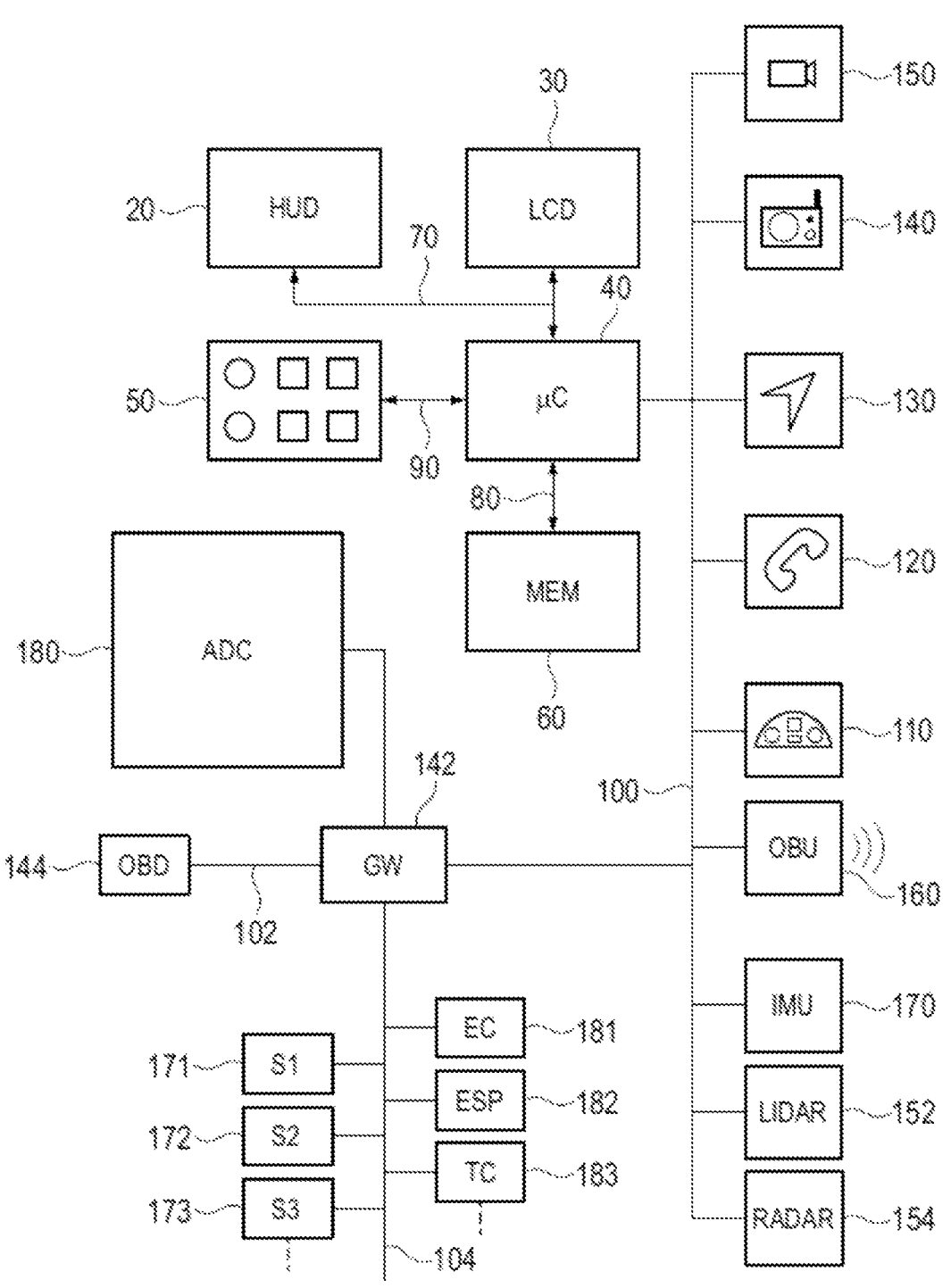
FIG. 3 shows a block diagram of the onboard electronics in the vehicle.

FIG. 3 shows a schematic illustration of a block diagram for the onboard electronics 200, to which the infotainment system in the vehicle 10 also belongs. The touchscreen 30, a computer 40, an input unit 50, and a memory 60 are used to operate the infotainment system. The touchscreen 30 comprises both a display screen for displaying changing graphic information, as well as an operating surface (touch-sensitive layer) located on top thereof, with which the user can input commands. It can be an LCD touchscreen.

The touchscreen 30 is connected to the computer 40 via a data line 70. The data line can be configured according to the LVDS standard (Low Voltage Differential Signaling). The touchscreen 30 receives control data for controlling the display surface in the touchscreen 30 from the computer 40 via the data line 70. The input unit is indicated by the reference numeral 50. The aforementioned operating elements, such as buttons, dials, sliders or push-button knobs, with which an operator can make inputs via the menu navigation. An input refers in general to the selection of a menu option, such as the changing of a parameter, i.e., switching a function on and off, etc.

The memory 50 is connected to the computer 40 via a data line 80. A pictogram index and/or symbol index is store in the memory, containing pictograms and/or symbols for the possible displaying of additional information.

The other parts of the infotainment system, e.g., a camera 150, radio 140, navigation unit 130, telephone 120, and instrument cluster 110, are connected to the device for operating the infotainment system via a data bus 100. High-speed variants of the CAN bus according to the ISO standard 11898-2 can be used as the data bus. Alternatively, an ethernet-based bus system such as BroadR-Reach could also be used. Bus systems using optical fibers for data transfer can also be used. Examples thereof are the MOST bus (Media Oriented System Transport) or the D2B bus (Domestic Digital Bus). A vehicle measurement unit 170 is also connected to the data bus 100. This vehicle measurement unit 170 is used to detect movement by the vehicle, in particular accelerations thereof. It can be a conventional IMU unit (Inertial Measurement Unit). An IMU unit typically contains acceleration sensors and rotational rate sensors such as a laser gyroscope or a magneto-gyroscope. The vehicle measurement unit 170 can be regarded as part of the odometry for the vehicle 10. These also include wheel speed sensors.

It should also be noted here that the camera 150 can be a conventional video camera. In this case, it records 25 fps, corresponding to the interlace recording mode of 50 half-images/second. Alternatively, a special camera can be used, that records more frames per second, in order to increase the precision in recognizing objects that move faster, or which record light in a spectrum other than that of visible light. Numerous cameras can be used for environmental observation. The aforementioned radar or lidar systems 152 and 154 can also be used for scanning the environment, or expanding the scanning thereof. The vehicle 10 is equipped with the communication module for wireless internal and external communication.

The camera 150 is used primarily for object recognition. Typical objects that are to be recognized are traffic signs, leading, surrounding, and parked vehicles, and other road users, intersections, turns, potholes, etc. If an object of potential significance is recognized, information can be output via the infotainment system. Typically, symbols for the recognized traffic signs are shown. This can also be a warning message, if the object poses a hazard. The information is projected directly in the field of vision by the HUD 20. An example of an object that poses a danger is the case in which the image analysis of the images provided by the camera 150 indicates that a vehicle is approaching an intersection from the right that the vehicle itself is also approaching. The image analysis takes place in the computer 40. Known algorithms for object recognition can be used for this. As a result, a danger symbol is shown where the vehicle is located. The display thereof takes place such that the danger symbol does not conceal the vehicle, because the driver would otherwise not be able to determine precisely what the danger is.

The object recognition algorithms are processed by the computer 40. The number of images that can be analyzed per second depends on the capacity of the computer. A function for automated driving typically has various phases: in the perception phase, data from various environment sensors are processed, and combined on a high-performance platform. The vehicle must also be located on a very precise digital map, on the basis of its GNSS position. The data are used to generate a three-dimensional model of the environment, and provide information regarding dynamic and stationary objects, as well as open spaces surrounding the vehicle (object list). In some circumstances, the precision of the GNSS position in insufficient. For this reason, odometry data in the vehicle are also drawn on, in order to improve the precision of the position determination.

A motor control unit is indicated by the reference numeral 181. This reference numeral 182 corresponds to an ESP control unit, and the reference numeral 183 refers to a transmission control unit. There can also be other control units in the vehicle, such as an additional driving dynamic control unit (for vehicles with an electrically adjustable suspension), an airbag control unit, etc. The interconnection of these control units, all of which can be attributed to the category of the drive train, normally takes place with the CAN bus system (Controller Area Network) 104, which is standardized according to the ISO standard, usually as ISO d11898-1. Some of the sensors 171 to 173 in a motor vehicle, which are not normally connected to individual control units, are connected to the bus system 104, and their sensor data are sent to the individual control units via the bus. Examples of sensors in a motor vehicle are wheel speed sensors, steering angle sensors, acceleration sensors, rotational rate sensors, tire pressure sensors, distance sensors, knock sensors, air quality sensors, etc. In particular, the wheel speed sensors and the steering angle sensors are part of the odometry for the vehicle. The acceleration sensors and rotational rate sensors can also be connected directly to the vehicle measurement unit 170.

Figure 4:
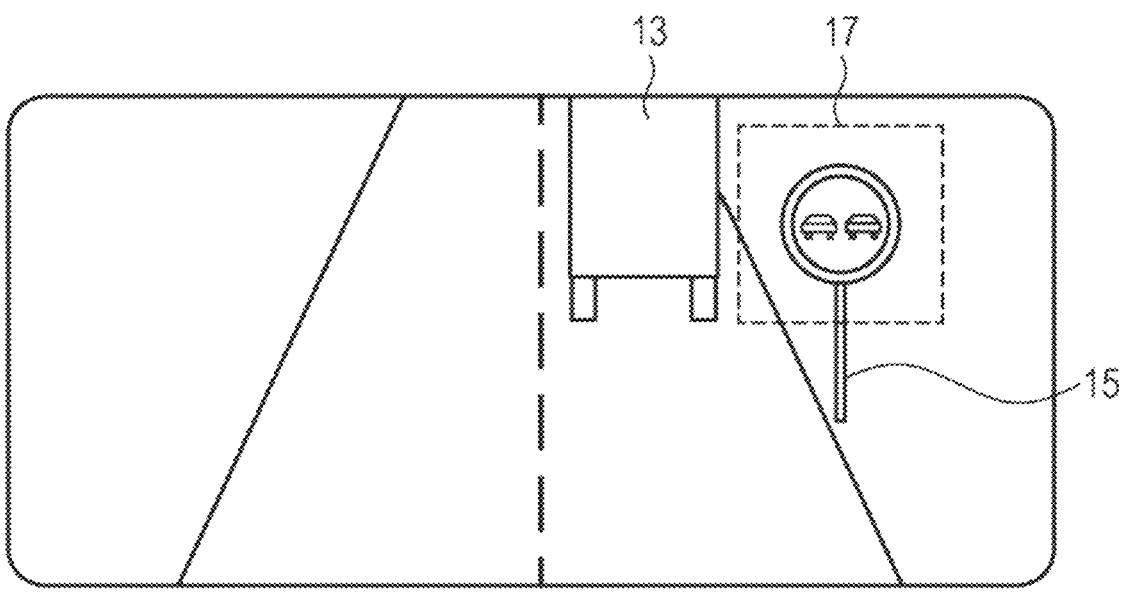
FIG. 4 shows a first illustration of a first driving situation in order to explain the problems in checking the functioning of an image analysis system in the vehicle under some aspects of the present disclosure.
Figure 5:
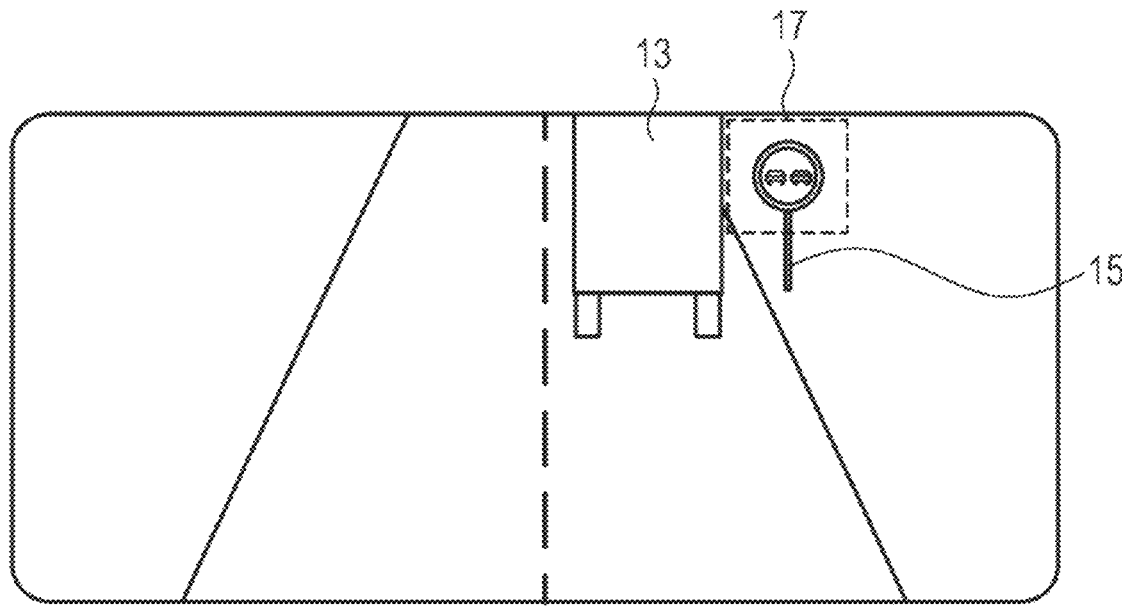
FIG. 5 shows a second illustration of the first driving situation, wherein the second illustration shows the driving situation at an earlier point in time under some aspects of the present disclosure.

FIGS. 4 and 5 illustrate a simplified functioning of an image analysis system in one embodiment, as it is used in vehicles. These show an image recorded by the front camera 150 on the vehicle 10. This is an example of traffic sign recognition. FIG. 4 shows the image recorded when the vehicle is close to the traffic sign 15. FIG. 5 shows an image recorded at a greater distance to the traffic sign 15, indicating a no passing zone. The traffic sign recognition system is required to recognize a traffic sign under normal conditions at a standard recognition distance of 80 meters to the traffic sign, as the vehicle 10 approaches the traffic sign 15. FIG. 4 shows the image in the situation in which the vehicle has reached a distance of 20 meters. In FIG. 5, the vehicle 10 is still 40 meters form the traffic sign 15. According to the image analysis, the traffic sign is first recognized when the vehicle is 40 meters away from the traffic sign 15. The checking function of the image analysis system establishes that the traffic sign recognition is late under these conditions. The checking function then executes a test, with which a preliminary analysis of the recorded image takes place. This shows that a truck 13 can be seen in front of the vehicle in the image. As can be seen in FIG. 5, the traffic sign 15 is just to the right of the truck 13. The checking function then establishes that the traffic sign 15 is concealed by the truck at a greater distance. For this reason, the images recorded between 80 meters and the actual traffic sign recognition at 40 meters are archived at a lower quality.

FIGS. 4 and 5 can also be used to explain another erroneous recognition situation. In these examples, a traffic sign 15 indicating a no passing zone for trucks is first recognized at a distance of 40 meters. At a distance of 20 meters to the traffic sign 15, it is first recognized that this traffic sign 15 indicates an absolute no passing zone. In this situation, the checking function reacts as follows: by storing the marked area 17 of the recorded image, it is archived in the images of a higher quality. The rest of the images are recorded with a lower quality. This is the case for all images recorded between 40 meters and 20 meters thereto.

Figure 6:
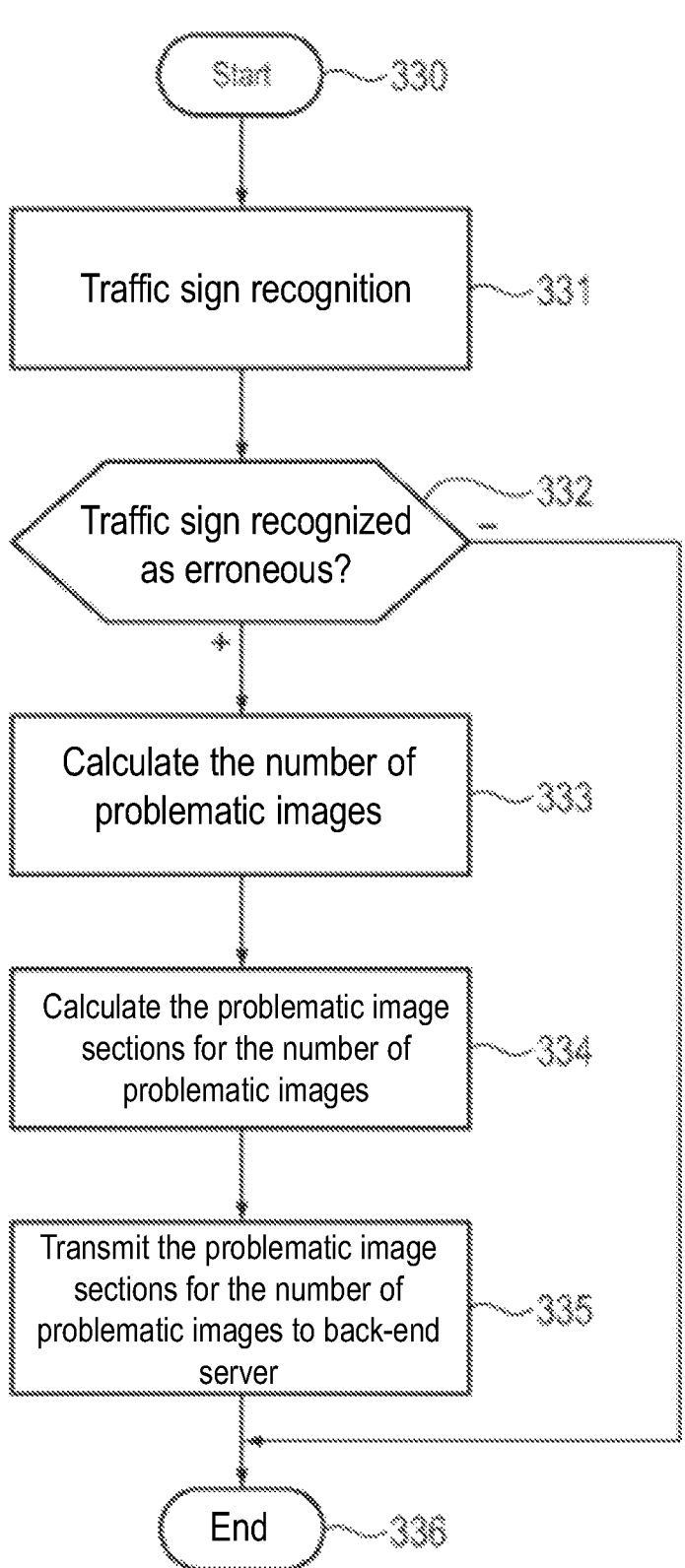
FIG. 6 shows a flow chart for a program for capturing image material for checking the functioning of the image analysis system in the first driving situation under some aspects of the present disclosure.

FIG. 6 shows a flow chart for a program with which the checking function is implemented under some aspects of the present disclosure. This variation of the program is intended for the second variation, in which an erroneous recognition of the traffic sign first takes place, and a correct recognition first takes place when the vehicle is closer to the traffic sign. The start of the program is indicated by the reference numeral 310. The algorithm for traffic sign recognition is processed in step 312. This is an object recognition algorithm, which carries out pattern recognition on the basis of patterns stored in a table. All of the valid traffic signs are known and their patterns can be stored in a table. Typically, the pattern recognition is improved by a folding operation, in which the recorded images are folded together with the known patterns. These algorithms are known and available to the person skilled in the art. If a traffic sign is recognized in this manner, the distance at which it is recognized is also determined and stored.

It is checked in step 314 whether or not the traffic sign recognition complies with the standard. In this case, the traffic sign recognition was erroneous for two reasons. First, the recognition did not take place at the standard distance of 80 meters from the traffic sign. Furthermore, a limited no passing was first recognized, which was then revised to an absolute no passing as the sign was approached. If a traffic sign recognition complying with the standard is established in this step, no images need to be recorded for control purposes, and the program stops at step 322. In this case, however, an erroneous recognition was detected. At this point, the program continues in step 316. A calculation of problematic image takes place in step 316. Because the standard recognition distance is not obtained, the calculation can take place as follows. The first recognition takes place at 40 meters. The correct recognition first takes place at 20 meters. The images of interest are therefore those recorded between the standard recognition distance of 80 meters and 20 meters.

It is also checked whether the erroneous recognition can be explained in step 316. It is determined through image analysis that a truck 13 is in front of the vehicle, and it has presumably concealed the traffic sign 15 until the first recognition thereof. It is thus concluded that the images recorded between 80 meters and 40 meters are less important for the subsequent check. These images are therefore recorded at a lower quality.

The problematic image sections are calculated in step 318. In the case of the traffic sign recognition in FIGS. 4 and 5, the image section that is marked around the traffic sign 15 is selected as relevant. This image section is therefore selected with a higher quality at a distance ranging from 40 to 20 meters.

The problematic images and problematic image sections are then sent from the memory 60 to the communication module 160, and the communication module 160 sends these images to the backend server 320 via mobile communication in step 320. They are archived there. The archived images are later analyzed by experts or by machines with artificial intelligence in the computing center. The check has the purpose of detecting potential problems in the image analysis system. The results of the checks can be used to improve the analysis algorithms. Ideally, the improved analysis algorithm can then be returned to the vehicle 10 via an OTA (Over the Air) download, and installed therein. It may also be the case that a systemic error is detected in the check, which is due to the camera 150 being out of adjustment. In this case, a message can be sent to the vehicle 10, in order to inform the driver that the vehicle needs to be brought in for service. The program stops at step 322.

Figure 7:
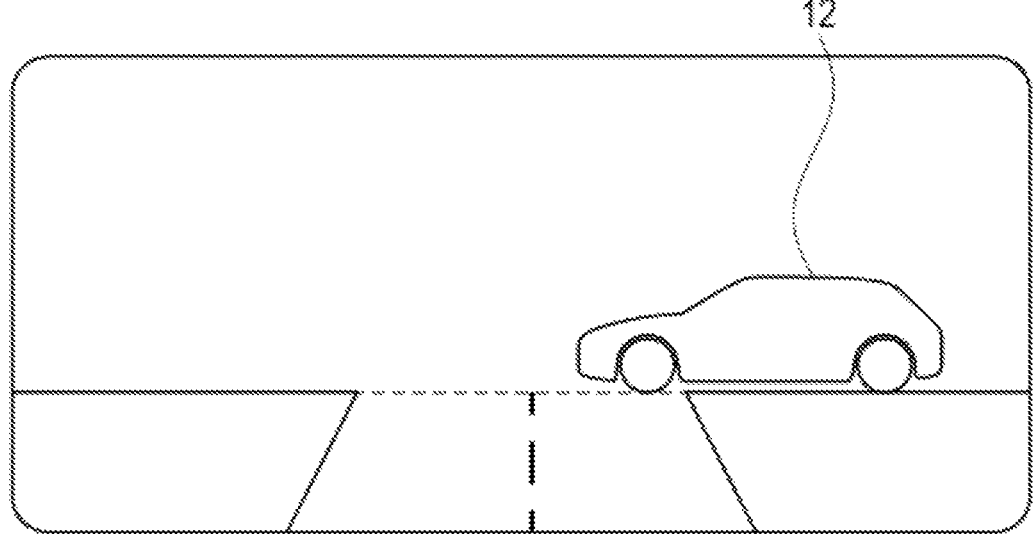
FIG. 7 shows a first illustration of a second driving situation in order to explain the problems in checking the functioning of an image analysis system in the vehicle under some aspects of the present disclosure.

An example is shown in FIG. 7, in which a vehicle approaches a road having right of way. Another vehicle 12 on this road is first recognized prior to turning onto the road by analyzing the images and/or the data from the radar and lidar sensors 154, 152. The autonomous vehicle 10 must stop quickly for this reason. This may be uncomfortable for the passengers. This abrupt braking should be avoided, particularly with autonomous vehicles, in order to give the passengers a feeling of security. At least in the test phase, this is classified as not desirable by the onboard electronics. The same can take place in the normal operation, i.e. after the test phase. There are numerous possibilities for this. A first possibility is that this classification is made if a predefined acceleration value is exceeded. Another possibility is that the classification is made if the occupants or driver have a negative reaction that the driver/occupant state detection system recognizes. Another possibility for this classification is if the minimum distance to the object recognition is not maintained (in the case of a vehicle approaching from the right).

In order to reduce the amount of image data that needs to be stored, only those image sections from the ring buffer are stored or sent in which the object can be found.

Figure 8:
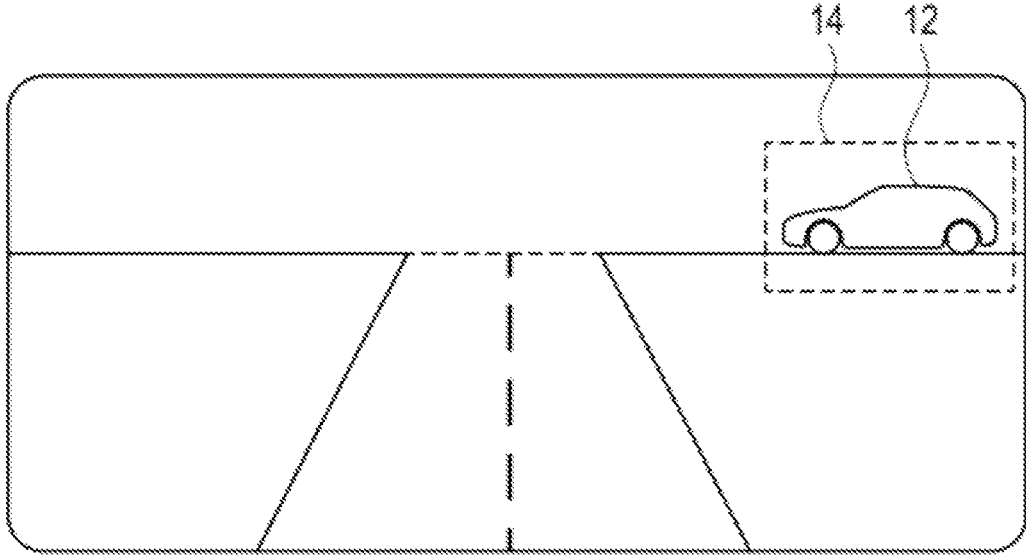
FIG. 8 shows a second illustration of the second driving situation, wherein the second illustration of the second driving situation shows the driving situation at an earlier point in time under some aspects of the present disclosure.

FIG. 8 shows an image of the same situation illustrated in FIG. 7, at an earlier point in time. In this example, the vehicle 12 approaching from the right is further away from the intersection. FIG. 8 even shows an image at a point in time at which the vehicle 12 is not yet recognized by the object recognition as an approaching vehicle. This can be for a number of reasons. The vehicle may still be too far away, and the object recognition algorithm may not yet be able to recognize the vehicle as such from the available image information. Or the vehicle 12 may be hidden by other objects (e.g., trees or bushes).

The reason for why the approaching vehicle 12 is recognized so late should be determined through subsequent analysis. For this reason, it is determined which images recorded by the camera, and potentially by other imaging sensors, should be archived for subsequent analysis. As a result, the amount of data that is to be archived should be reduced as much as possible.

Figure 9:
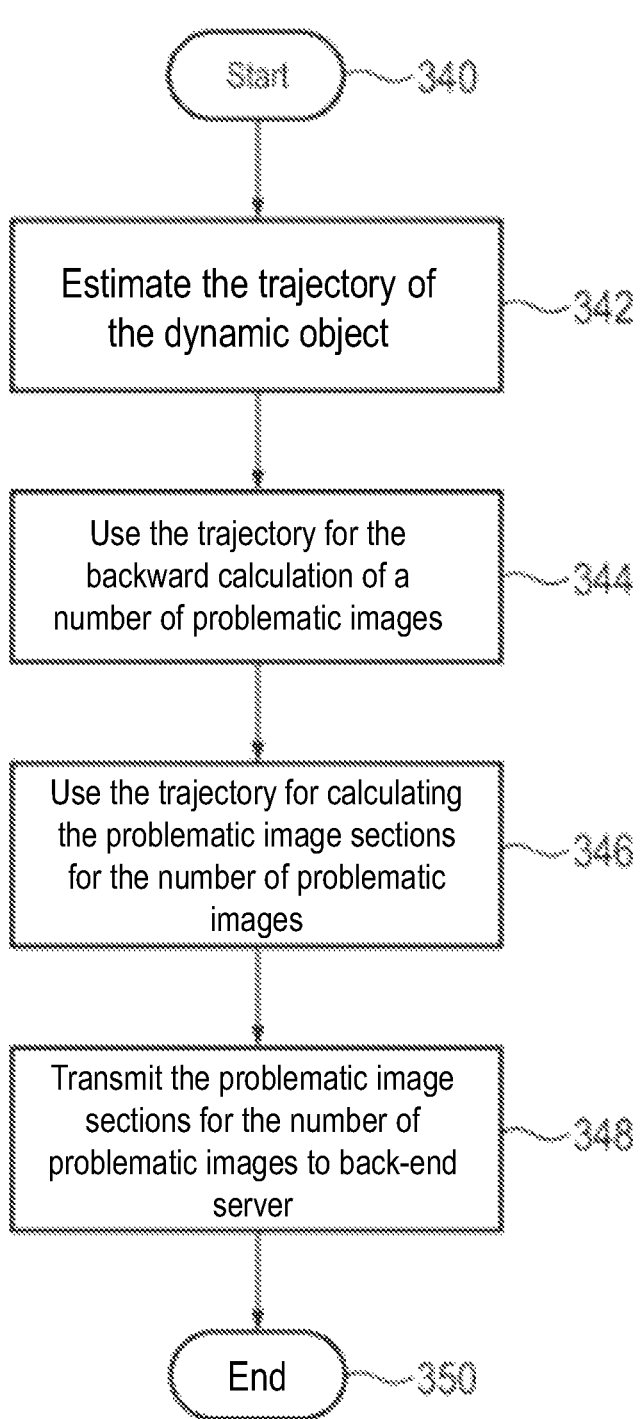
FIG. 9 shows a flow chart for a program for capturing image material for checking the functioning of the image analysis system in the second driving situation under some aspects of the present disclosure.

How this takes place is explained below in reference to FIG. 9. In this example, FIG. 9 shows a flow chart for a program with which the checking function is implemented in another embodiment of the present disclosure. The program start is indicated by the reference numeral 340. The program is started when a hazard situation has been recognized, in which a moving object is recognized too late. The trajectory of the moving object that has been recognized too late is estimated in step 342. This takes place in the following manner: the current speed and acceleration of the object is determined at the point in time when the object is recognized from numerous successive video images and drawing on the various sensor data form the observer vehicle 10. A trajectory of the object is estimated therewith, and potentially drawing on the geometry of the route known from the map in the navigation system 130. In conjunction with the estimation of the movement of the vehicle, an image section 14 can be determined in the recorded image data for the point in time in the past, within which the object (not yet recognized at this point in time) must have been located. This image section 14 is also referred to as a "bounding box." It can be assumed that the bounding box would be larger at earlier points in time, than at the points in time that are not so far in the past. The size of the bounding box is affected by the object parameter (e.g., size) at the time of the recognition, as well as by the uncertainties, possible alternatives in the trajectory, known sensor errors/imprecisions, and empirically determined factors.

The estimated trajectory is used for a reverse calculation in step 344, in order to determine a number of problematic images with which it is to be checked why the approaching vehicle 12 was not recognized therein. The distance between the observing vehicle 10 and the approaching vehicle 12 is also taken into account therein. If the distance exceeds a predefined limit, there is no need to archive any earlier images. For the various environment sensors, the respective distances until which the desired objects can still be recognized are known. The program then continues at step 346. A calculation of the number of problematic images takes place in step 346.

The respective bounding boxes for the number of problematic images are calculated in step 348. This also takes the estimated trajectory into account.

In another variant, it is also determined whether not recognizing an object can be due to a possible concealment of the relevant object by other, possibly correctly recognized objects (other vehicles, houses/walls/noise protection walls, trees, bushes, forests) known from navigation data. In this case, the images may not be transmitted. The time period for problematic images may be limited in that the assumed object trajectory is obvious, or in that the relevant object was not yet within range of the camera at an earlier point in time.

The problematic image sections 14 are then sent from the ring buffer in the memory 60 to the communication module 160 in step 348, and the communication module 160 sends these image data to the backend server 320 via a mobile connection. They are archived there. The archived images are later analyzed by experts or using machines with artificial intelligence in the computing center. The check is used to detect potential problems in the image analysis system. The results of the checks can be used to improve the analysis algorithms. Ideally, the improved analysis algorithm can be returned to the vehicle 10 via an OTA download (Over the Air), and installed therein. It may also be the case that a systemic error is detected in the check, which is due to the camera 150 being out of adjustment. In this case, a message can be sent to the vehicle 10, in order to inform the driver that the vehicle needs to be brought in for service. The program stops at step 350.

The number and quality of the images that are to be archived may be affected by various factors. In addition to the cases presented above, the following factors may also be specified:

Weather Conditions

With adverse weather conditions, vision is severely limited. This may be such that it is no longer possible to recognize any objects. In this case, other environment detection sensors such as radar and lidar sensors may provide better results. In any case, the number of images or image sections that are to be archived can be limited with adverse weather conditions, because the objects in question cannot be detected at the standard recognition distance.

Position Precision

The precision of the position determination based on GNSS signals and odometry signals can also be dependent on the weather. It may also depend on other factors. One example thereof is the environment in which the vehicle is travelling. In a city, satellite signal reception may be limited by construction. This can also be the case when travelling overland. Satellite signals can be weakened in forests. There may also be poor reception in mountains, due to tectonics. In these cases, it is therefore proposed that more images or image sections are captured. It is then more probable that the relevant sections of the route will also be recorded, despite imprecise positioning.

Quality of the Road Surface

The quality of the road surface can also have a similar impact. Strong vibrations occur on cobblestones, such that the images that are recorded may be blurred. On slick surfaces, due to ice, snow or rain, a friction coefficient is determined by the drive-slippage control. If the slippage is large enough, the odometry data are no longer reliable, and these effects should be taken into account in the effects impacting the positioning precision.

Time of Day

Image quality varies significantly over the course of the day. A distinction should be made at least between daytime and nighttime. Data from radar or lidar sensors should be used more than camera data at night.

Traffic Conditions

A distinction can be made here between urban traffic, highway traffic, and rural traffic. In urban traffic, a particularly precise detection of traffic signs is important. In this case, the number of captured images may be increased. In slow traffic on highways, the number of captured images can be reduced.

Temporary storage of the images or image sections 14 that are to be archived takes place in the vehicle 10. The memory 60 can be used for this. With the practical implementation there is a ring buffer configured for this in the memory 60. This is managed such that the newly captured images are successively written into the free memory area in the ring buffer. When the free memory area is full, the already used part of the ring buffer is overwritten. By using the allocated memory area as a ring buffer, the oldest part of memory is always overwritten. The images or image sections 14 can be stored in a compressed or uncompressed format. It is recommended, however, to use a lossless compression format, to avoid loss of any relevant image content. One example of a lossless compression format if the FFmpeg codec. The images are stored in a corresponding file format. Various data container formats can be used for this. One example thereof is the ADTF format, which was developed for the automotive industry, and the TIFF format. Other container formats for storing image and sound data are MPEG, Ogg, Audio Video Interleave, DIVX, Quicktime, Matroska, etc. If the images are sent to a backend server 320 while the vehicle is underway, it may be sufficient to configure the ring buffer for a 20 second recording period. There can also be a separate memory in the vehicle on which the images are archived. A USB hard drive can be used for this, which can be removed to connect it to a computer which is then used to analyze the archived images.

Figures 10, 11:
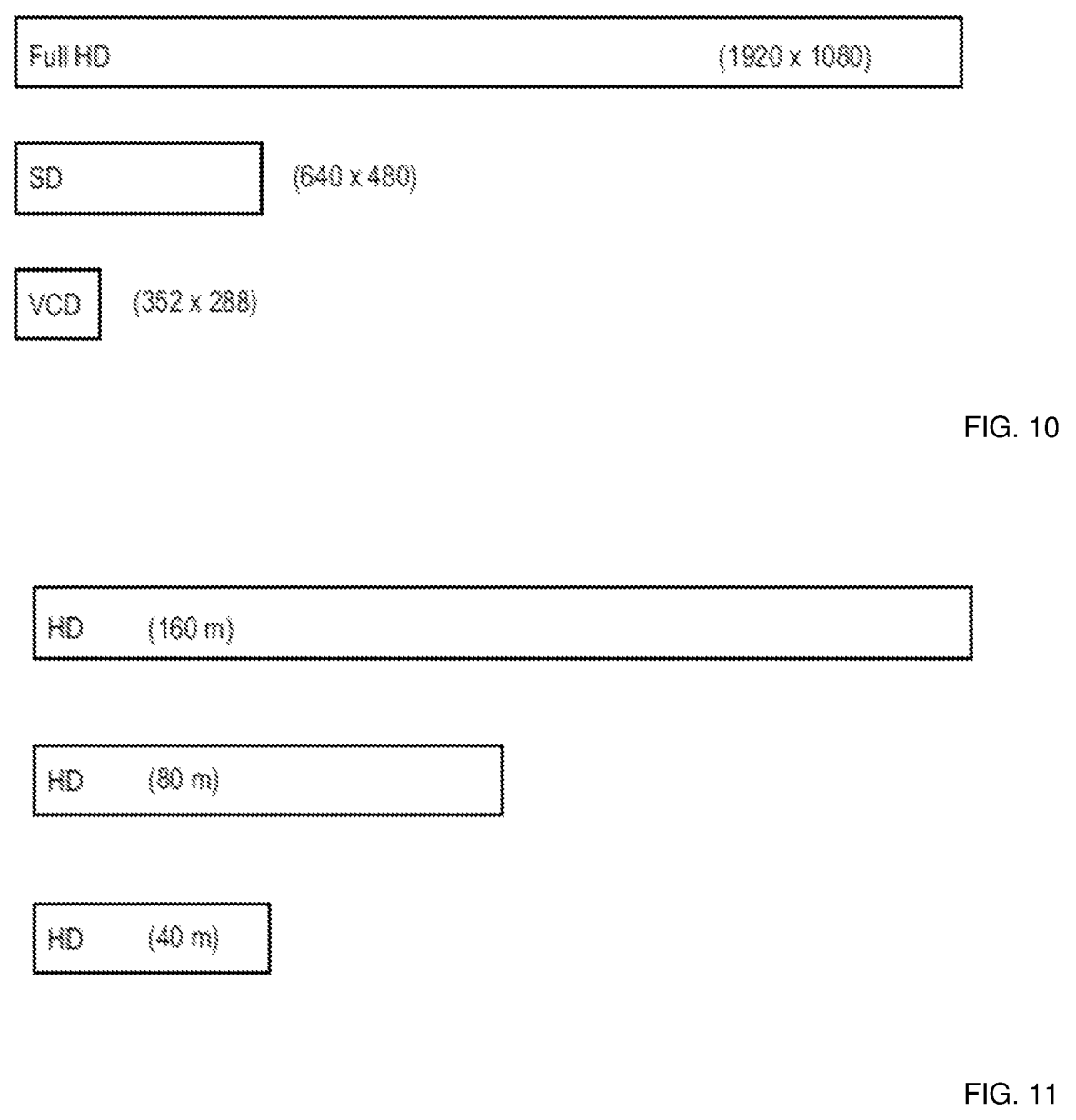

FIG. 10 shows how the amount of data that is to be archived can be reduced by reducing the image quality. The amount of image data for the various image qualities: full HD, with a resolution of 1920×1080 pixels, SD, with a resolution of 640×480 pixels, and VCD, with a resolution of 352×288 pixels, are listed from top to bottom.

FIG. 11 shows the effects of varying the number of images or image sections 17 on the basis of the positioning precision or weather conditions, etc., under some aspects of the present disclosure. In this example, if the length of recording is increased to a distance of 160 meters due to positioning precision, there is twice as much data to be archived. If the distance is reduced to 40 meters, there is only half as much.

All of the examples contained herein, as well as the certain formulations, are not to be limited to the specific examples listed herein. The person skilled in the art knows that the block diagrams shown herein represent a conceptual view of an exemplary circuit arrangement. Similarly, it should also be noted that a flow chart, state transition diagram, pseudocode, etc. represents various variations for illustrating the processes that are substantially stored in computer-readable media, and can thus be executed by a computer or processor. The objects specified in the claims can also expressly be people.

It should be noted that the proposed method, and the associated devices can be implemented in the form of software, hardware, firmware, special processors, or a combination thereof. Special processors can comprise application-specific integrated circuits (ASICs), reduced instruction set computers (RISCs) and or field-programmable gate arrays (FPICs). The proposed method and device are preferably implemented as a combination of hardware and software. The software is preferably installed as an application on a program memory. This is typically a computer platform-based machine, which contains hardware such as one or more central processing units (CPUs), a random-access memory (RAM), and one or more input/output (I/O) interface(s). An operating system is also typically installed on the computer platform. The various processes and functions described herein can be part of the application, or a part that is executed via the operating system.

The disclosure is not limited to the exemplary embodiments described herein. There is room for adjustments and modifications, which the person skilled in the art would also regard as belonging to the disclosure due to his expert knowledge.

The present disclosure has been explained in greater detail in reference to the exemplary embodiments using its use in vehicles, by way of example. Reference is also made here to the use thereof in airplanes and helicopters, e.g., for landing maneuvers or when used for searches, etc.

The present disclosure can also be used in remote controlled devices such as drones and robots that make significant use of image analysis. Other application possibilities include smartphones, tablets, personal assistants, or data glasses.

LIST OF REFERENCE SYMBOLS

10 observer vehicle
12 approaching vehicle
13 leading vehicle
14 first relevant image section
15 traffic sign
17 second relevant image section
20 head-up display
30 touchscreen
40 computer
50 input unit
60 memory
70 data line to display
80 data line to memory
90 data line to input unit
100 data bus
110 instrument cluster
120 telephone

130 navigator
140 radio
142 gateway
144 onboard diagnosis interface
150 camera
160 communication module
170 vehicle measurement unit
171 sensor 1
172 sensor 2
173 sensor 3
180 control unit for automatic driving function
181 motor control unit
182 ESP control unit
183 transmission control unit
200 evolved packet core
210 base station
300 internet
310 roadside unit
320 backend server
330-336 various program steps in a first computer program
340-350 various program steps in a second computer program
Uu wireless interface for communication UE and eNodeB
PC5 wireless interface for vehicle direct communication

The invention claimed is:

1. A method for capturing image material for an image analyzing system for a vehicle, comprising:
   receiving image data in a memory of the image analyzing system;
   executing, via a processor of the image analyzing system, first object recognition processing on the received image data;
   processing, via the processor, a recognized object to determine that one or more differences of the recognized object to a temporal or spatial reference exceeds a tolerance limit;
   storing, based on the determined one or more differences, at least a portion of the received image data in a memory configured to retain the image data for further processing; and
   executing, via the processor, a second object recognition processing on the stored image data, wherein the second object recognition processing comprises a refined object recognition algorithm configured to improve detection accuracy relative to the first object recognition processing.

2. The method of claim 1, wherein processing the recognized object comprises calculating a trajectory of a moving object, and wherein storing at least the portion of the image data comprises storing the image data based on the calculated trajectory in the memory configured to retain the image data for further processing.

3. The method of claim 2, further comprising performing a reverse calculation using the calculated trajectory to calculate a number of images or image sections in the image data in which the moving object may be visible, even if the moving object cannot be recognized via the first object recognition processing.

4. The method of claim 3, wherein a distance to the recognized object at which the object recognition takes place via the first object recognition processing is checked in order to determine whether the object recognition takes place at a correct time or place, and wherein a standard recognition distance is established, indicating a starting distance at which the second object recognition processing should recognize the object.

5. The method of claim 1, further comprising receiving position data for the recognized object, and processing the position data to determine a distance between the vehicle and the recognized object, for determining the one or more differences in the first object recognition processing.

6. The method of claim 5, wherein the determined distance comprises at least one of a standard recognition distance and an object recognition distance, wherein, when a standard recognition distance and an object recognition distance are determined, processing the recognized object comprises calculating a trajectory of a moving object, and wherein storing at least portions of the image data is performed based on the determined distance, including, when both a standard recognition distance and an object recognition distance are determined, transmitting the at least portions of the image data between the standard recognition distance and the object recognition distance to either the memory of the image analyzing system or to an external memory configured to retain the image data for further processing.

7. The method of claim 6, wherein the storing at least portions of the image data comprises archiving at least portions of the image data with a higher quality and a lower quality.

8. An image analyzing system for capturing image material for a vehicle, comprising:
    a memory configured to receive image data;
    a processor, operatively coupled to the memory, wherein the processor and memory are configured to:
    execute, via a processor of the image analyzing system, first object recognition processing on the received image data;
    process, via the processor, a recognized object to determine if one or more differences of the recognized object to a temporal or spatial reference exceeds a tolerance limit;
    store, based on the determined one or more differences, at least a portion of the received image data in a memory configured to retain the image data for further processing; and
    execute a second object recognition processing on the stored image data, wherein the second object recognition processing comprises a refined object recognition algorithm configured to improve detection accuracy relative to the first object recognition processing.

9. The image analyzing system of claim 8, wherein the processor and memory are configured to process the recognized object by calculating a trajectory of a moving object, and wherein storing at least the portion of the image data comprises archiving the image data based on the calculated trajectory in the memory configured to retain the image data for further processing.

10. The image analyzing system of claim 9, wherein the processor and memory are configured to perform a reverse calculation using the calculated trajectory to calculate a number of images or image sections in the image data in which the moving object may be visible, even if the moving object cannot be recognized via the first object recognition processing.

11. The image analyzing system of claim 10, wherein the processor and memory are configured to determine a distance to the recognized object at which the object recognition takes place via the first object recognition processing and checked in order to determine whether the object recognition takes place at a correct time or place, and wherein a standard recognition distance is established, indicating a starting distance at which the second object recognition processing should recognize the object.

12. The image analyzing system of claim 8, wherein the processor and memory are configured to receive position data for the recognized object, and process the position data to determine a distance between the vehicle and the recognized object, for determining the one or more differences in the first object recognition processing.

13. The image analyzing system of claim 12, wherein the determined distance comprises at least one of a standard recognition distance and an object recognition distance, wherein, when a standard recognition distance and an object recognition distance are determined, wherein the processor and memory are configured to process the recognized object comprises calculating a trajectory of a moving object, and wherein the storing at least portions of the image data is performed based on the determined distance, including, when both a standard recognition distance and an object recognition distance are determined, transmit the at least portions of the image data between the standard recognition distance and the object recognition distance to either the memory of the image analyzing system or to an external memory configured to retain the image data for further processing.

14. The image analyzing system of claim 13, wherein the processor and memory are configured to store at least portions of the image data by storing at least portions of the image data with a higher quality and a lower quality.

15. A non-transitory computer-readable medium having stored therein instructions executable by one or more processors of an image analyzing system for a vehicle, to:
    receive image data in a memory of the image analyzing system;
    execute first object recognition processing on the received image data;
    process a recognized object to determine if one or more differences of the recognized object to a temporal or spatial reference exceeds a tolerance limit;
    store, based on the determined one or more differences, at least a portion of the received image data in a memory configured to retain the image data for further processing; and
    execute a second object recognition processing on the stored image data, wherein the second object recognition processing comprises a refined object recognition algorithm configured to improve detection accuracy relative to the first object recognition processing.

16. The non-transitory computer-readable medium of claim 15, wherein the instructions are further configured to process the recognized object by calculating a trajectory of a moving object, and wherein storing at least the portion of the image data comprises archiving the image data based on the calculated trajectory in the memory configured to retain the image data for further processing.

17. The non-transitory computer-readable medium of claim 16, wherein the instructions are further configured to perform a reverse calculation using the calculated trajectory to calculate a number of images or image sections in the image data in which the moving object may be visible, even if the moving object cannot be recognized via the first object recognition processing.

18. The non-transitory computer-readable medium of claim 17, wherein a distance to the recognized object at which the object recognition takes place via the first object recognition processing is checked in order to determine whether the object recognition takes place at a correct time or place, and wherein a standard recognition distance is established, indicating a starting distance at which the second object recognition processing should recognize the object.

19. The non-transitory computer-readable medium of claim 15, wherein the instructions are further configured to receive position data for the recognized object, and processing the position data to determine a distance between the vehicle and the recognized object, for determining the one or more differences in the first object recognition processing.

20. The non-transitory computer-readable medium of claim 19, wherein the determined distance comprises at least one of a standard recognition distance and an object recognition distance, wherein, when a standard recognition distance and an object recognition distance are determined, processing the recognized object comprises calculating a trajectory of a moving object, and wherein storing at least portions of the image data is performed based on the determined distance, including, when both a standard recognition distance and an object recognition distance are determined, transmitting the at least portions of the image data between the standard recognition distance and the object recognition distance either the memory of the image analyzing system or to an external memory configured to retain the image data for further processing.

\*   \*   \*   \*   \*